United States Patent
Hansen et al.

(10) Patent No.: US 10,885,463 B2
(45) Date of Patent: Jan. 5, 2021

(54) METADATA-DRIVEN MACHINE LEARNING FOR SYSTEMS

(71) Applicant: Microsoft Technology Licensing, LLC, Redmond, WA (US)

(72) Inventors: Klaus Marius Hansen, Lyngby (DK); Andreea-Bogdana Botez, Lyngby (DK); Andrei S. Panko, Copenhagen (DK); Thomas Hejlsberg, Hørsholm (DK); Marko Perisic, Birkerød (DK)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 644 days.

(21) Appl. No.: 15/288,978

(22) Filed: Oct. 7, 2016

(65) Prior Publication Data

US 2018/0012143 A1 Jan. 11, 2018

Related U.S. Application Data

(60) Provisional application No. 62/360,170, filed on Jul. 8, 2016.

(51) Int. Cl.
| | |
|---|---|
| *G06N 20/00* | (2019.01) |
| *G06Q 10/00* | (2012.01) |
| *G06F 9/46* | (2006.01) |
| *G06Q 10/04* | (2012.01) |
| *G06N 5/02* | (2006.01) |

(52) U.S. Cl.
CPC .............. *G06N 20/00* (2019.01); *G06F 9/46* (2013.01); *G06N 5/022* (2013.01); *G06Q 10/00* (2013.01); *G06Q 10/04* (2013.01)

(58) Field of Classification Search
None
See application file for complete search history.

(56) References Cited

U.S. PATENT DOCUMENTS

| | | | | |
|---|---|---|---|---|
| 5,810,014 A | * | 9/1998 | Davis | G06K 9/00496 600/508 |
| 6,970,882 B2 | * | 11/2005 | Yao | G06F 16/30 |

(Continued)

FOREIGN PATENT DOCUMENTS

WO 2015192239 A1 12/2015

OTHER PUBLICATIONS

Han, et al., "Automatic Document Metadata Extraction using Support Vector Machines", In Proceedings of Joint Conference on Digital Libraries, May 27, 2003, 12 pages.

(Continued)

*Primary Examiner* — George Giroux
(74) *Attorney, Agent, or Firm* — Workman Nydegger (57) ABSTRACT

Training prediction models and applying machine learning prediction to data is illustrated herein. A prediction instance comprising a set of data and metadata associated with the set of data identifying a prediction type is obtained. The data and metadata are used to determine an entity to train a prediction model using the prediction type. A trained prediction model is obtained from the entity. A notification system may be configured to react to monitor contextual information and apply the prediction. A workflow system may automatically perform a function in a workflow based on prediction.

20 Claims, 11 Drawing Sheets

(56) References Cited

U.S. PATENT DOCUMENTS

| | | | |
|---|---|---|---|
| 7,624,074 B2* | 11/2009 | Weston | G06N 20/00 |
| | | | 706/1 |
| 7,672,909 B2 | 3/2010 | Meijer et al. | |
| 7,930,639 B2 | 4/2011 | Baier et al. | |
| 8,417,715 B1* | 4/2013 | Bruckhaus | G06Q 10/04 |
| | | | 707/758 |
| 8,498,986 B1 | 7/2013 | Botros et al. | |
| 8,843,427 B1* | 9/2014 | Lin | G06N 20/00 |
| | | | 706/45 |
| 9,253,054 B2 | 2/2016 | Maturana et al. | |
| 9,690,938 B1* | 6/2017 | Saxe | G06F 21/563 |
| 10,229,186 B1* | 3/2019 | Reiner | G06F 16/319 |
| 2003/0177117 A1* | 9/2003 | Vishnubhotla | G06F 16/2465 |
| 2006/0179017 A1* | 8/2006 | Forman | H04L 51/12 |
| | | | 706/16 |
| 2007/0038978 A1* | 2/2007 | Meijer | G06F 8/437 |
| | | | 717/106 |
| 2012/0191631 A1* | 7/2012 | Breckenridge | G06N 20/00 |
| | | | 706/12 |
| 2013/0211555 A1 | 8/2013 | Awson et al. | |
| 2013/0254144 A1* | 9/2013 | Heidasch | G06N 3/084 |
| | | | 706/13 |
| 2013/0325770 A1* | 12/2013 | Heidasch | G06N 3/0427 |
| | | | 706/20 |
| 2014/0337429 A1 | 11/2014 | Asenjo et al. | |
| 2014/0358825 A1 | 12/2014 | Phillipps et al. | |
| 2014/0372346 A1 | 12/2014 | Phillipps et al. | |
| 2015/0006456 A1* | 1/2015 | Sudharsan | G06N 5/048 |
| | | | 706/46 |
| 2015/0026114 A1 | 1/2015 | Triff | |
| 2015/0170048 A1 | 6/2015 | Lin et al. | |
| 2016/0012350 A1 | 1/2016 | Narayanan et al. | |
| 2016/0217387 A1* | 7/2016 | Okanohara | G06N 20/00 |
| 2016/0232457 A1* | 8/2016 | Gray | G06T 11/206 |
| 2016/0350323 A1* | 12/2016 | Suvorov | G06F 16/164 |
| 2016/0360382 A1* | 12/2016 | Gross | G06F 3/0488 |
| 2017/0006135 A1* | 1/2017 | Siebel | H04L 67/02 |
| 2017/0178019 A1* | 6/2017 | Duggan | G06F 8/60 |
| 2017/0178027 A1* | 6/2017 | Duggan | G06F 16/22 |
| 2017/0243132 A1* | 8/2017 | Sainani | H04L 41/22 |

OTHER PUBLICATIONS

Ouyang, et al., "Automatic Metadata Extraction Using Machine Learning", Retrieved on: Jul. 20, 2016 Available at: https://www.researchgate.net/publication/32962608_Automatic_Metadata_Extraction_Using_Machine_Learning.

Kaykova, et al., "RSCDF: A Dynamic and Context-Sensitive Metadata Description Framework for Industrial Resources", In Eastern-European Journal of Enterprise Technologies, Jun. 2005, 31 pages.

"SAP ERP—Microsoft Machine Learning", Retrieved on: Jul. 28, 2016 Available at: http://www.advellence.com/en/software-engineering/sap-solutions/sap-erp-microsoft-machine-learning/.

Noyes, Katherine, "SAP's ERP app for SMBs gets an overhaul for digital transformation", Published on: Jun. 29, 2016 Available at: http://www.pcworld.com/article/3090068/saps-erp-app-for-smbs-gets-an-overhaul-for-digital-transformation.html.

"Predictivez", Retrieved on: Jul. 28, 2016 Available at: http://predictivez.com/.

Peiguang, Hu, "Predicting and Improving Invoice-to-Cash Collection Through Machine Learning", In Master Thesis of Massachusetts Institute of Technology, Jun. 2015, 92 pages.

"International Search Report and Written Opinion Issued in PCT Application No. PCT/US2017/040574", dated Oct. 10, 2017, 11 Pages.

* cited by examiner

| MachineLearningType=Regression | | | | |
|---|---|---|---|---|
| MachineLearningRole=Identifier | MachineLearningRole=Feature | MachineLearningRole=Feature | MachineLearningRole=Feature | MachineLearningRole=Label |
| Invoice No.: Code50 | Cust. Avg. Late Days: Integer | Total Amount: Decimal | Payment Terms: Code 10 | Late Days: Integer |
| 12 | 3 | 234.4 | 1M(8D) | 2 |
| 13 | 2 | 129 | COD | 0 |
| 14 | -1 | 30 | CM | -1 |
| ... | ... | ... | ... | ... |

| HOME | ACTIONS | MANAGE | FUNCTIONS |

NEW · PURCHASE INVOICE · 107240 · S · FABRIKAM, INC

✕ The sales forecast for item 1928 · S · "AMSTERDAM Lamp" recommends that you restock. Do you want to add a purchase line to the invoice? Yes, Please — 504

107240 · Fabrikam, Inc.

General     Show more

| Vendor | Fabrikam, Inc. | Posting Date | 01-04-2016 |
| Contact | Maria Campbell | Due Date | 10-04-2016 |
| Posting Description | Invoice 107240 | Vendor Invoice No. | * |

| Item | Description/Comment | Quantity | Unit of Measure Code | Direct Unit Cost Excl. Tax | Tax Group code | Line Amount Excl. Tax | Line Discount % |
|------|--------------------|----------|----------------------|---------------------------|----------------|----------------------|-----------------|
| *    |                    |          |                      |                           |                |                      |                 |

METADATA-DRIVEN MACHINE LEARNING FOR SYSTEMS

CROSS-REFERENCE TO RELATED APPLICATIONS

This application claims the benefit of and priority to U.S. Provisional Patent Application Ser. No. 62/360,170 filed on Jul. 8, 2016 and entitled "Metadata-Driven Machine Learning for Systems," which application is expressly incorporated herein by reference in its entirety.

BACKGROUND

Background and Relevant Art

Computers and computing systems have affected nearly every aspect of modern living. Computers are generally involved in work, recreation, healthcare, transportation, entertainment, household management, etc.

Computing systems can be used to collect, store, manage, and interpret generated data. Using such systems, computer users can monitor the data.

It may be useful to use data collected by a system in predictive ways. For example, the data may be used to predict when and/or the probability that certain events will occur Previously, to implement such predictive functionality, data would be provided to a specialized machine learning system that had a known specialized functionality. Thus, a system would collect data and provide such data to the machine learning system that would provide the appropriate prediction function that could then be used by the original system to perform predictive functionality. However, this required using a large number of very specialized machine learning systems, one for each type of machine learning predictive functionality.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Training prediction models and applying machine learning prediction to data is illustrated herein. A prediction instance comprising a set of data and metadata associated with the set of data identifying a prediction type is obtained. The data and metadata are used to determine an entity to train a prediction model using the prediction type. As a result, a trained prediction model is obtained from the entity.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Predicting and reacting to future events has typically involved specialized specific information being used in making predictions.

"Machine learning" (ML) can learn from examples of previously gathered data ("training data"), creating a prediction model, and subsequently predicting based on new data and the prediction model. In the embodiments illustrated herein, ML is able to analyze previously generated data and provide "insights" without the user requesting such insights. A machine learning system can run in the background and use a notification sub-system to let the user know of a given condition—or even initiate workflows following predefined rules to initiate favorable actions.

One example of machine learning-based prediction is inventory forecasting in which a machine learning algorithm, based on inventory levels over time for a product and potentially other information in an inventory control system, can predict future inventory levels of a product. Another example is payment time prediction for sales invoices in which a machine learning algorithm using training data on past sales invoices from a payment system (e.g., amount, payment terms, customer identifiers, and number of late days in payment) may predict the probability of a customer paying late on a new sales invoice.

While the above examples illustrate how machine learning might be used in an enterprise, machine learning algorithms may be used for other purposes, such as predicting traffic flows, weather patterns, event attendance, disease outbreaks or virtually any other predictive analysis.

Some embodiments illustrated herein can be implemented in a fashion that simplifies a base system by reducing the complexity of an interface between a base system and specialized machine learning components. In particular, embodiments illustrated herein implement a subsystem that can analyze data and metadata from a base system and determine machine learning processing that should be performed on the data and provide the data to the appropriate components for performing the machine learning processing. In contrast, a previous base system would necessarily have more complex interfaces with machine learning systems, where the base systems would need to have logic built into the base system itself for sending the data to the appropriate machine learning components Additionally, or alternatively, embodiments may be implemented where prediction can be integrated into the workflows of end users. For example, it may be useful to automate the purchase of new inventory on the basis of inventory level predictions. This can automatically be performed based on the results of predictive analysis.

Additionally, or alternatively, embodiments may be implemented where predictions can be integrated into the context of end users. For example, a purchasing agent will not typically use predictive analysis themselves to create a purchase invoice, but rather will wait for direction from others to create the purchase invoice based on the other predictive analysis. However, some embodiments described herein can provide direction to end users directly, e.g., provide a contextually relevant suggestion, without additional direction, to perform various actions based simply on the results of a predictive analysis.

Figure 1:
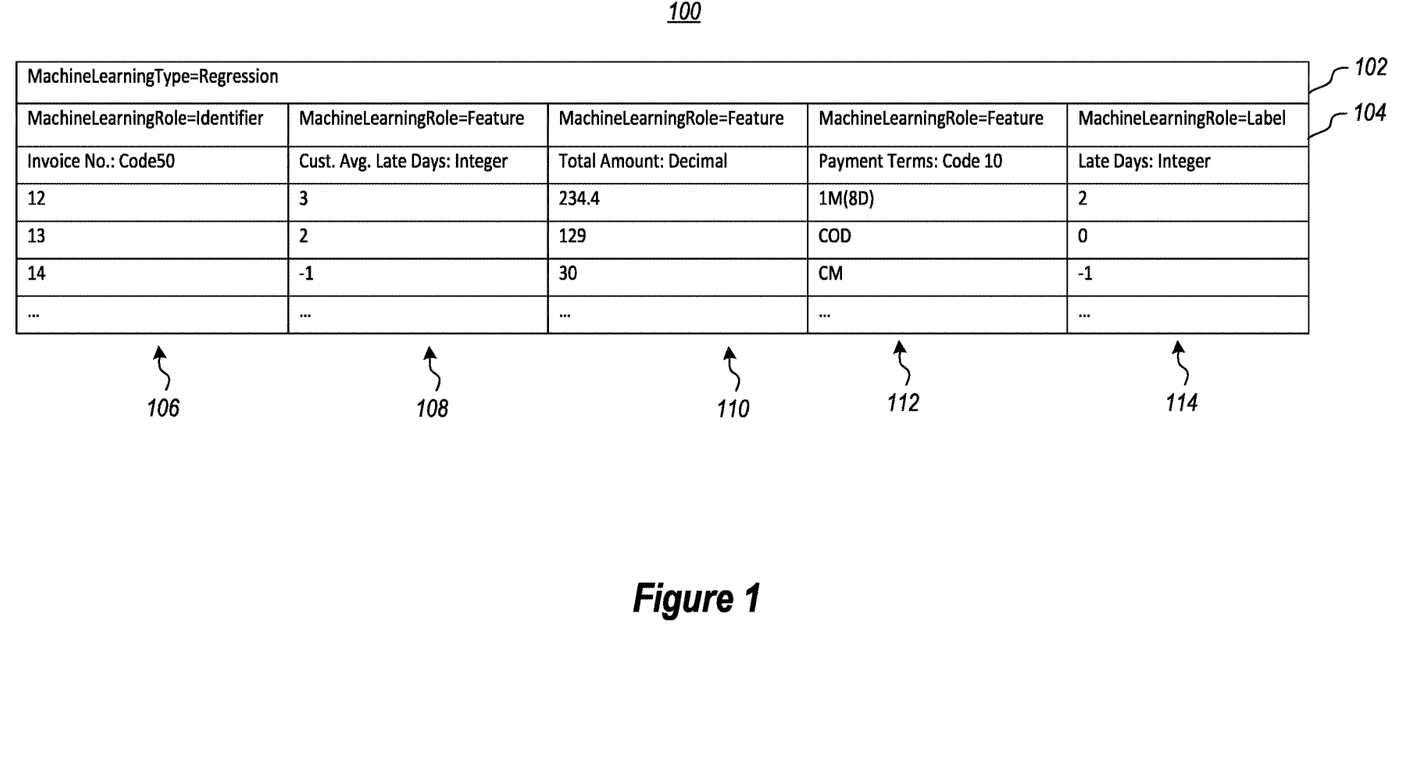
FIG. 1 illustrates a table including data and machine learning metadata.

Some embodiments of the invention illustrated herein enable machine learning by associating metadata with data, such as tabular data in tables and columns in a data storage and/or processing system. In some embodiments, this may be done by actually adding metadata to tables in table cells as illustrated in FIG. 1, which shows a table 100 which includes table metadata 102 applicable to the entire table 100 and column metadata 104 applicable to individual columns in the table 100. Table metadata 102 in the table 100 (or in some embodiments in a side-structure associated with the table) describes one or more prediction types that should be used for data in the table 100. For example, in FIG. 1, the table metadata 102 identifies that a regression analysis should be used for the data in the table 100 to create a prediction model and for prediction tasks. In the illustrated example, the metadata can be metadata that supports prediction types that work on tabular data. Such prediction types may include time series forecasting (i.e., when future values in a time series is being predicted), regression (i.e., when a continuous value is being predicted), classification (two-class and/or multi-class classification) (i.e., when the data are being used to predict a category), anomaly detection (i.e., identifying unusual data points), and/or clustering (i.e., grouping data in a relevant way).

Column metadata 104 describes the role of columns as identifiers, features, or labels. Examples of each of these are illustrated in FIG. 1. In this example, an identifier identifies a specific instance. In machine learning, a feature is a quantifiable property of a thing being observed. A label in supervised machine learning is that which is to be predicted. In the machine learning examples illustrated herein, a prediction instance can be used for predictions. A prediction instance, as used herein, can include one or more of training data, machine learning metadata (including table metadata and/or column metadata as described below), a trained prediction model, and/or a record for prediction (i.e., a record that is missing one or more labels).

Initially, a prediction instance will often only include training data. The training data is data previously collected. This data will include features and labels.

Machine learning metadata can be added to the prediction instance as illustrated below. The machine learning metadata can define the type of analysis, i.e., a prediction type, to be performed on the training data, as well as identifying features and labels in the training data. Training can be performed using the training data, according to the metadata, to create a prediction model that helps to identify patterns in the data, that can be used for predictions. A prediction instance having a trained model associated with it is referred to herein as a trained prediction instance.

Some prediction instances can have records for prediction added to them. These may be records that are missing one or more labels. The prediction model can be applied to predict the one or more labels. Alternatively, in clustering or classification analysis, records for prediction may be complete as the analysis is typically performed on complete records. An example is now illustrated.

FIG. 1 illustrates the table 100 with table metadata 102 describing that data in the table 100 is used for the machine learning type "regression". In this case, a prediction model is trained using past training data taken from columns 106, 108 110 and 112 (the features). "Late Days" (the label) in column 114, for a new record added to the table that includes all data but the label, will be predicted based on the observed features: "Cust. Avg. Late Days", "Total Amount", and "Payment Terms" in the columns 106, 108 and 110 for a particular sales invoice identified by an identifier as illustrated in column 106. Thus, for example, for the new invoice (not shown) with an identifier 15, "Late Days", 0 can be predicted based on knowing that the "Cust. Avg. Late Days" is 3, the "Total Amount" is 13.4, and "Payment Terms" is COD, and using training data from previous invoices, including previous "Cust. Avg. Late Days", "Total Amount", and "Payment Terms" and previous labels, such as "Late Days" in other records (e.g., records having identifiers 12-14) in the present example.

Given the table metadata identifying a prediction type, embodiments of the invention can automatically train a model based on existing data and labels and predict labels for new data. For example, data and metadata can be provided to a machine learning service 202 (see FIG. 2) which can automatically use the data 204 as training data and the metadata 206 (which may include the table metadata 102 and column metadata 104) to determine a prediction type to apply to the data 204. The data 204 may be historical data stored in a data store. Such data may include data marked as features and data marked as labels by column metadata.

Furthermore, because machine learning is declarative, machine learning may run in the background and/or as a batch, enabling proactive notification of predictions and inclusions in workflows. This enables a system that requires less direct user interaction and creates a more efficient system. Indeed, user interaction can affect a system's performance as the system pauses for interrupts and uses hardware intensive user interface inputs. Rather, the system is more efficient as it is able to perform actions autonomously without the need for user direction to identify certain conditions or predictions.

Further, as illustrated below, embodiments can optimize resource usage by selecting lower cost resources when appropriate. For example, if a prediction analysis, i.e., evaluation of a prediction type, is simple (such that it can be computed by a simple program in a local system), the computer program will not use external machine learning resources, but rather allow the local system to perform the analysis. An example of this would be classification or regression based on decision trees or time series forecasting based on a naïve model. In general, if a linear execution time (in terms of input data size) program can be devised to perform the prediction, the prediction could be performed locally.

Figure 2:
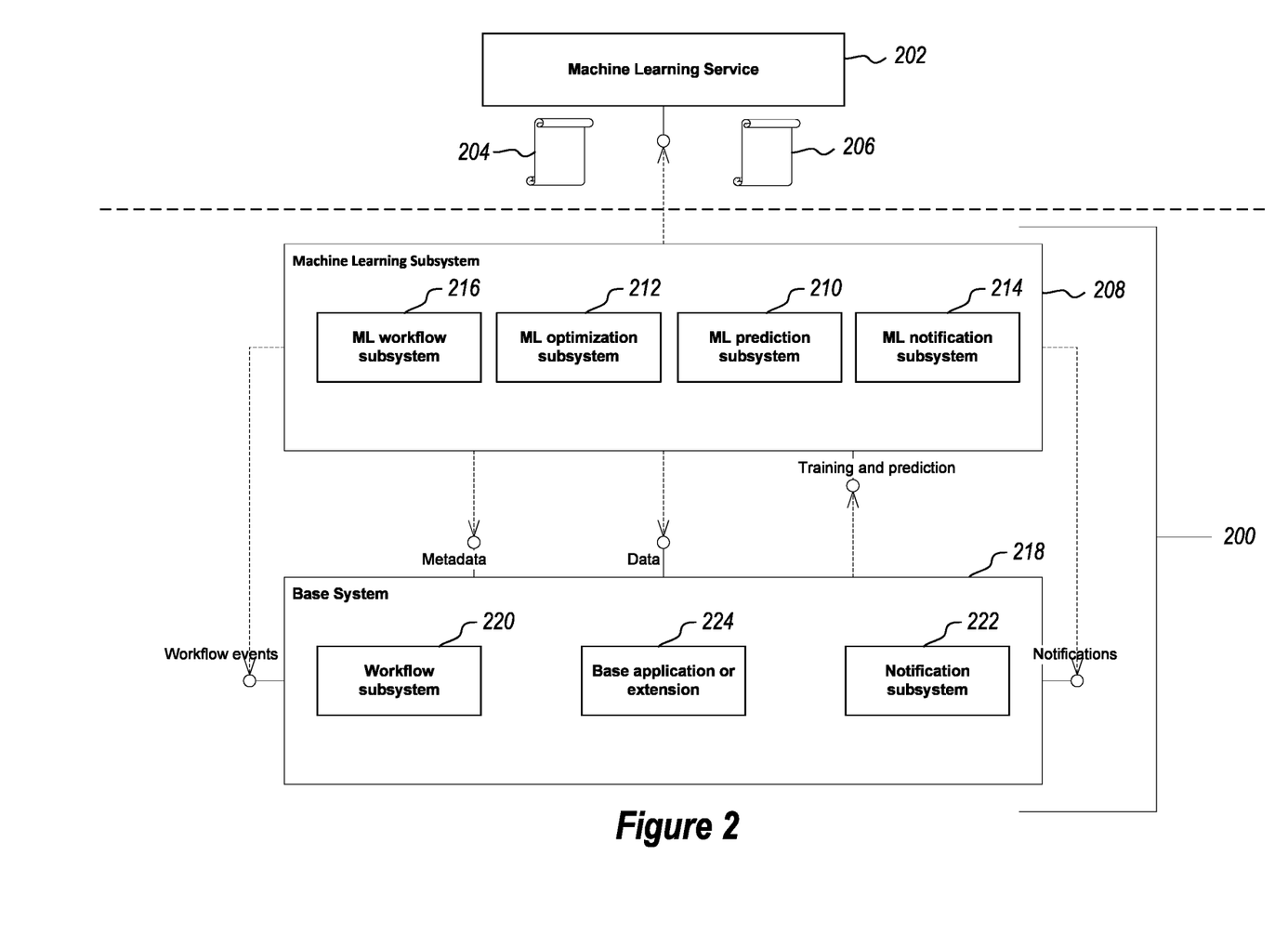
FIG. 2 illustrates a base system and a machine learning service.

In some embodiments, based on the knowledge of features, embodiments of the invention may optimize machine learning resource usage by executing acts for preprocessing data locally rather than sending the data to a machine learning service 202. For example, in time series forecasting, embodiments of the invention may, at the local system 200, and particularly at the ML optimization subsystem 212 as discussed in more detail below, decide that a time series is white noise and thus prevent the data 204 and metadata 206 from being sent to the machine learning service 202 where analysis would be unproductive, thus saving remote machine learning resources at the machine learning service 202. Another example is to not perform training for classification or regression if the training data size is below a threshold. In general, if it can be determined that the data is too noisy (as in the first example) or there is too little data, data should not be sent.

As noted above, embodiments are able to provide users with insights based on machine learning proactively, i.e., without the user explicitly requesting these insights. This is supported through, for example, enabling machine learning by metadata associated tables and columns, background processing and context and workflow integration enabled by metadata descriptions, optimization of machine learning resource usage based on metadata, etc.

Some embodiments of the invention may implement various components as illustrated in FIG. 2. FIG. 2 illustrates an architecture diagram of machine learning in a system 200. One such system may be Dynamics NAV available from Microsoft Corporation of Redmond, Wash. The subsystems below the dotted line are part of the system 200 (except as noted below), the items above the dotted line are external to the system 200, in the illustrated example.

These components illustrated in FIG. 2 include an ML subsystem 208 included in the system 200. Note that while the ML subsystem 208 is shown in the system 200, it should be appreciated that the ML subsystem may be implemented in some embodiments as a separate system.

The ML subsystem 208 illustrated includes an ML prediction subsystem 210, an ML optimization subsystem 212, an ML notification subsystem 214 and an ML workflow subsystem 216. Details of these are now illustrated.

Figure 3:
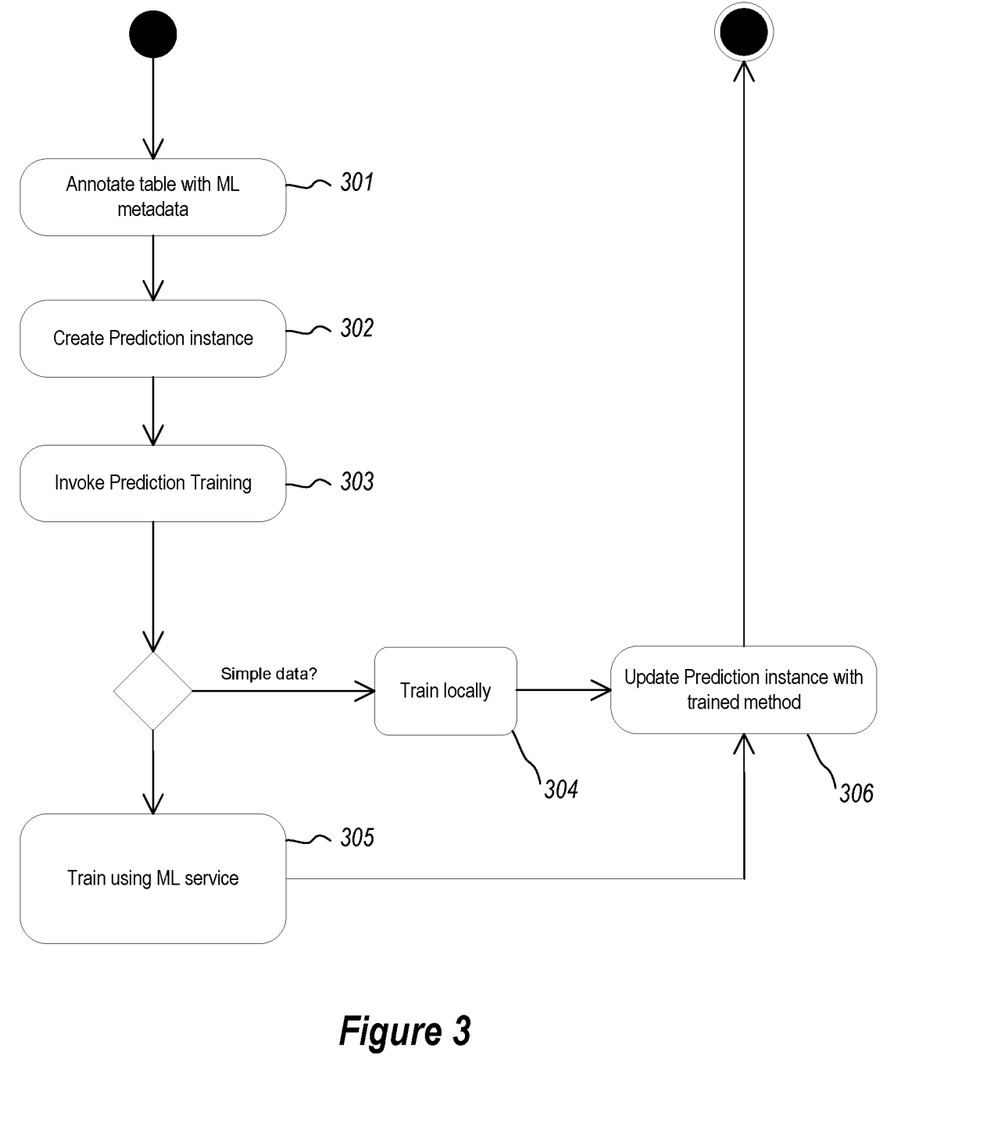
FIG. 3 illustrates a flow chart illustrating acts for training a model.
Figure 4:
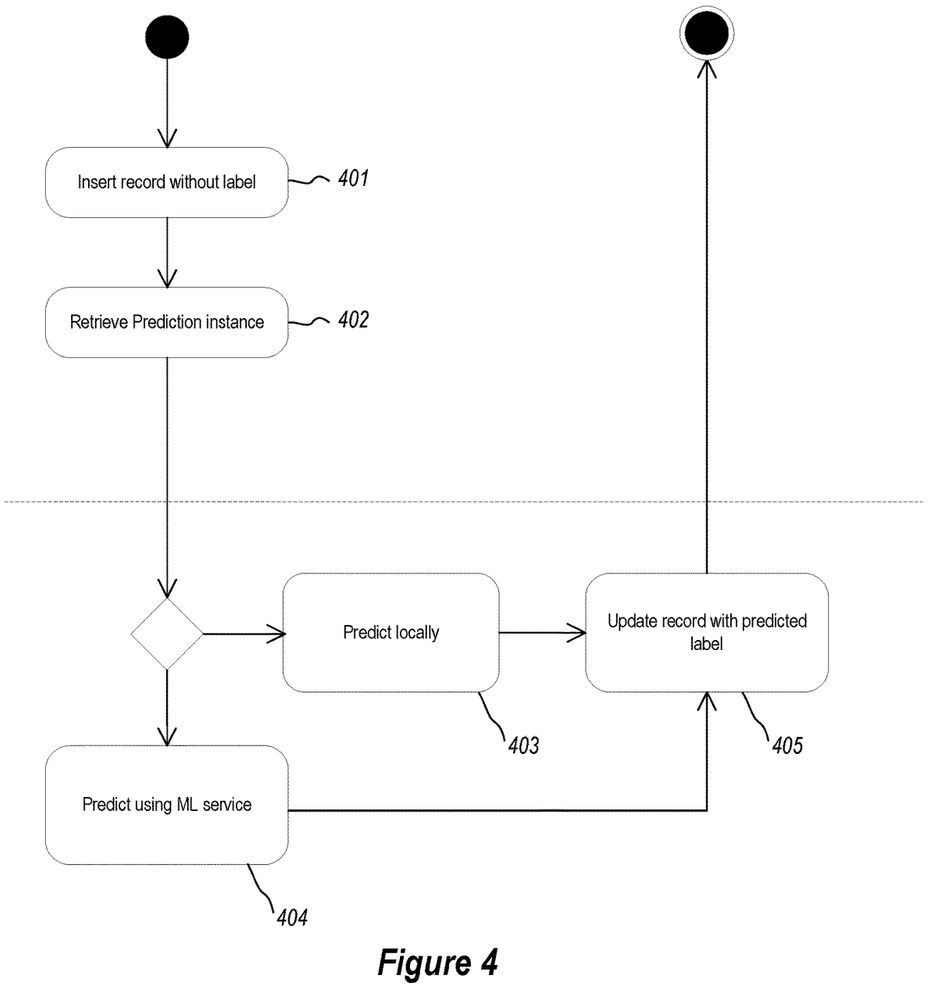
FIG. 4 illustrates a flow chart illustrating acts for performing a prediction.

The ML prediction subsystem 210 uses metadata annotations associated with tables. FIG. 1 shows an example of such an annotation in which a table has been annotated to be used in regression prediction type. A prediction type may then be instantiated and used by the developer in training a prediction model. Consider the following code with reference to FIGS. 3 and 4:

```
OBJECT Table 12345 InvoiceLateDaysPrediction
{
    OBJECT-PROPERTIES
    {
        Date=;
        Time=;
        Version List=;
    }
    PROPERTIES
    {
        MachineLearningType=Regression;
    }
    FIELDS
    {
        { 1 ;   ;Invoice No.       ;Code50   ;MachineLearningRole=Identifier }
        { 2 ;   ;Cust. Avg. Late Days;Integer ;MachineLearningRole=Feature }
        { 3 ;   ;Total Amount      ;Integer  ;MachineLearningRole=Feature }
        { 4 ;   ;Payment Terms     ;Code10   ;MachineLearningRole=Feature }
        { 5 ;   ;Late Days         ;Integer  ;MachineLearningRole=Label }
    }
    KEYS
    {
        { ;Invoice No.             ;Clustered=Yes }
    }
    FIELDGROUPS
    {
    }
    CODE
    {
        BEGIN
        END.
    }
}
```

Here, as illustrated at 301 in FIG. 3, this table (InvoiceLateDaysPrediction) is annotated to be used in machine learning through table metadata 102 on the table 100. This is illustrated by the table metadata: "MachineLearningType=Regression" and illustrated by the code above and in the table metadata 100 in FIG. 1.

In some embodiments, this table metadata 102 may be omitted in which case the type is deduced from the types of the label and features. The column metadata 104 specifies that it is late days that needs to be predicted by the column metadata including: "MachineLearningRole=Label" based on data in the remaining columns as indicated by the metadata "MachineLearningRole=Feature".

FIG. 3 illustrates creating a prediction instance at 302 and invoking prediction training at 303. Consider the following additional code which shows programmatically how these two acts are performed.

```
VAR
    PaymentTime: Record Payment Time;
    PaymentTimePrediction: Prediction;
BEGIN
    // Populate Payment Time table with labelled training
    data (illustrated at act 302 in Figure 3)
    PaymentTime.INIT;
    PaymentTime."Invoice No." := '12';
    PaymentTime."Cust Avg. Late Days" := 3;
    PaymentTime."Total Amount" := 234.4;
    PaymentTime."Payment Terms" := '1M(8D)';
    PaymentTime."Late Days" := 2;
    PaymentTime.INSERT;
    ...
    PaymentTime."Invoice No." := '13';
    ...
```

```
// Invoke prediction training (illustrated at act 303 in
Figure 3)
PaymentTimePrediction.TRAIN(PaymentTime);
```

Based on the table metadata 102, column metadata 104, and training data including previous records in data (with records also containing values for the label), the machine learning prediction subsystem 210 will choose an appropriate prediction model and train the chosen model (either locally or using the machine learning service 202), making it available to the system 200 for future predictions of records not containing values for the label.

The ML Optimization Subsystem 212 detects if training may be run locally (on the server) to not use external ML prediction resources. An example would be to calculate the autocorrelation function (ACF) to detect that a time series is white noise and thus that advanced prediction at the machine learning service 202 is neither necessary nor useful. The calculation ACF is cheap and subsequently a prediction may be a simple mean of historical values. Thus, as illustrated at 304 in FIG. 3, training may occur locally (e.g., at the ML subsystem 208 or the base system 218 of the system 200).

If training is not performed locally, training the model will be performed at the machine learning service 202 as illustrated at 305.

In either case, the trained model (or an identification of the trained model) can be returned to the system 200 where it can be used to update the prediction instance with the trained model as illustrated at 306 and used for subsequent predictions.

This drastically simplifies the task of programming predictions for the programmer since the programmer can program in terms of familiar abstractions (e.g., tables and metadata/properties) rather than machine learning abstractions (e.g., experiments, training, statistics). This means that the programmer can use predictions directly in their tailored solutions.

FIG. 4 illustrates a flowchart for simple prediction. FIG. 4 illustrates inserting a record into a prediction instance for training (see act 401 and 402). This may be done by adding a record missing a label (for the illustrated example) to the trained prediction instance created by the acts shown in FIG. 3. This is illustrated by the following code.

```
// Insert record without label for prediction
PaymentTime.INIT;
PaymentTime."Invoice No." := '15';
PaymentTime."Cust Avg. Late Days" := 3;
PaymentTime."Total Amount" := 13.4;
PaymentTime."Payment Terms" := 'COD';
PaymentTime.INSERT;
```

Prediction is then initiated on the prediction instance including the record without the label as illustrated by the following code:

```
PaymentTimePrediction.SETCALLBACK(CODEUNIT::"Payment
Time Training", 'Callback');
PaymentTimePrediction.PREDICT(PaymentTime);
END;
```

A determination may be made as to whether the prediction should be performed locally or by the machine learning service 202 as described above. The prediction is either performed locally at the system 200 as illustrated at 403 or as illustrated at 404 by the machine learning service 202. In either case, the inserted record is updated with the predicted label as illustrated at 405.

The ML Notification Subsystem 214 uses predicted values to identify situations in which users should be notified in the context of their work. An example would be in the context of a sales invoice in which the user is notified by the means of a non-blocking message box that the customer might pay late. In an alternative example, a user may be notified while they are creating a purchase invoice that is based on sales forecasts and inventory that a user should restock one or more items and add certain items to the purchase invoice. An example of this is illustrated in FIG. 5.

Figure 5:
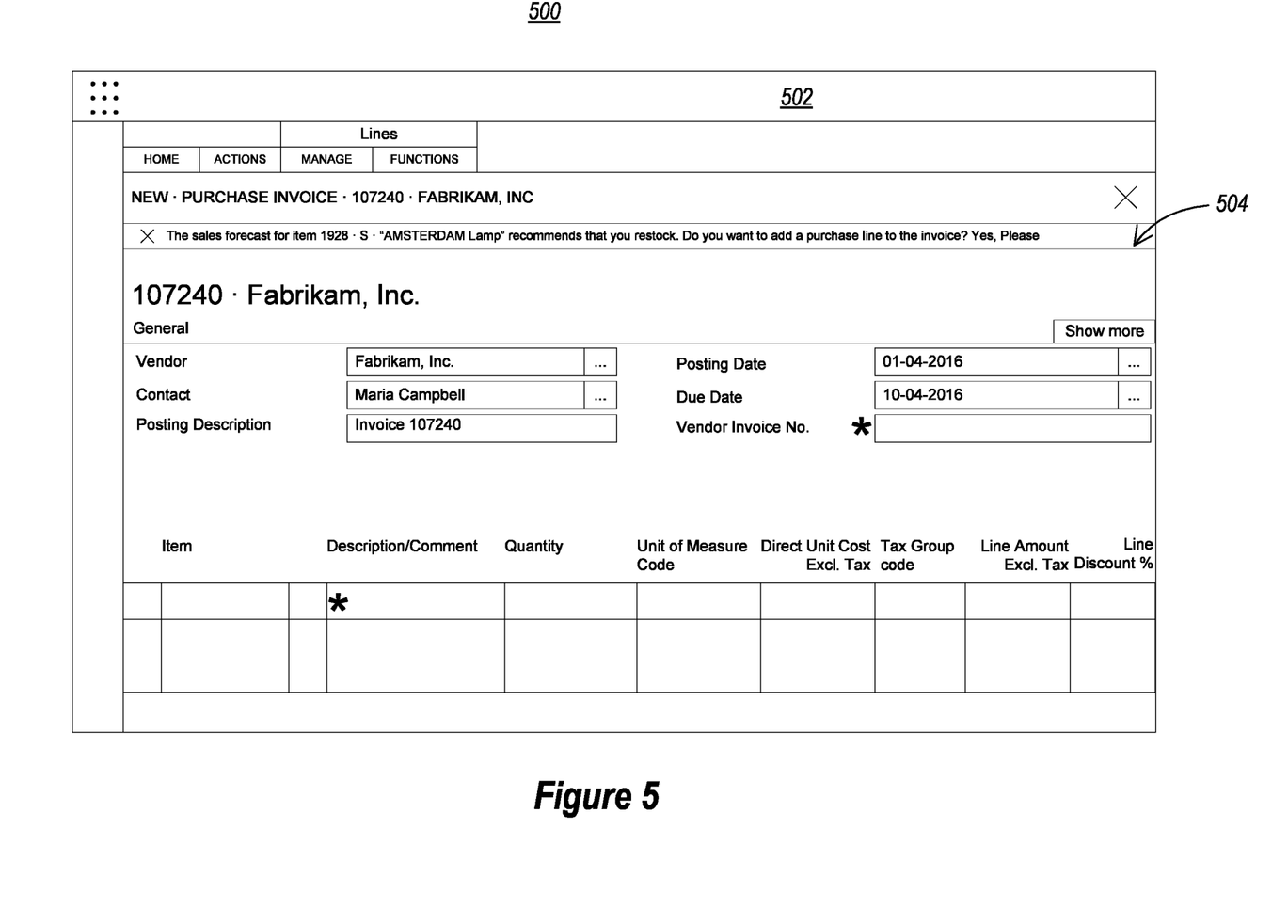
FIG. 5 illustrates an example user interface.

In particular, FIG. 5 illustrates a user interface 500. A user is in the context of creating a purchase invoice from a distributor in the user interface 500 of a base application or extension 224 (see FIG. 2). Sales forecasting can be performed by the machine learning service 202, which identifies probable sales for lamps available from the distributor. The ML notification subsystem 214 can compare a current stock of lamps to the probable sales and identify that additional lamps are needed to be able to fulfill the orders. The ML notification subsystem 214 can notify a notification subsystem 222 of the base system 218 which can then display the notification 504 in the invoice 502 being created by the user at the base application or extension 224. The notification 504 may include a selectable link that allows a purchase line requesting lamps to be added to the invoice 502.

Note that in some embodiments, an action may be taken automatically instead of prompting the user. For example, the purchase line may be added automatically to the invoice without user interaction. Illustratively, The ML workflow subsystem 216 uses predicted values to produce events that are reacted to by a workflow subsystem 220 in the base subsystem 218. For example, the prediction of a product going out of stock may start an automated workflow that creates a purchase invoice to reorder the product or adds a line to a purchase invoice. Thus for example, the purchase invoice 502 illustrated in FIG. 5 may be created automatically for the user or a line may be added to the purchase invoice 502 when evaluation of a prediction instance identifies that based on a sales forecast and inventory predictions that a product should be restocked.

Figure 6:
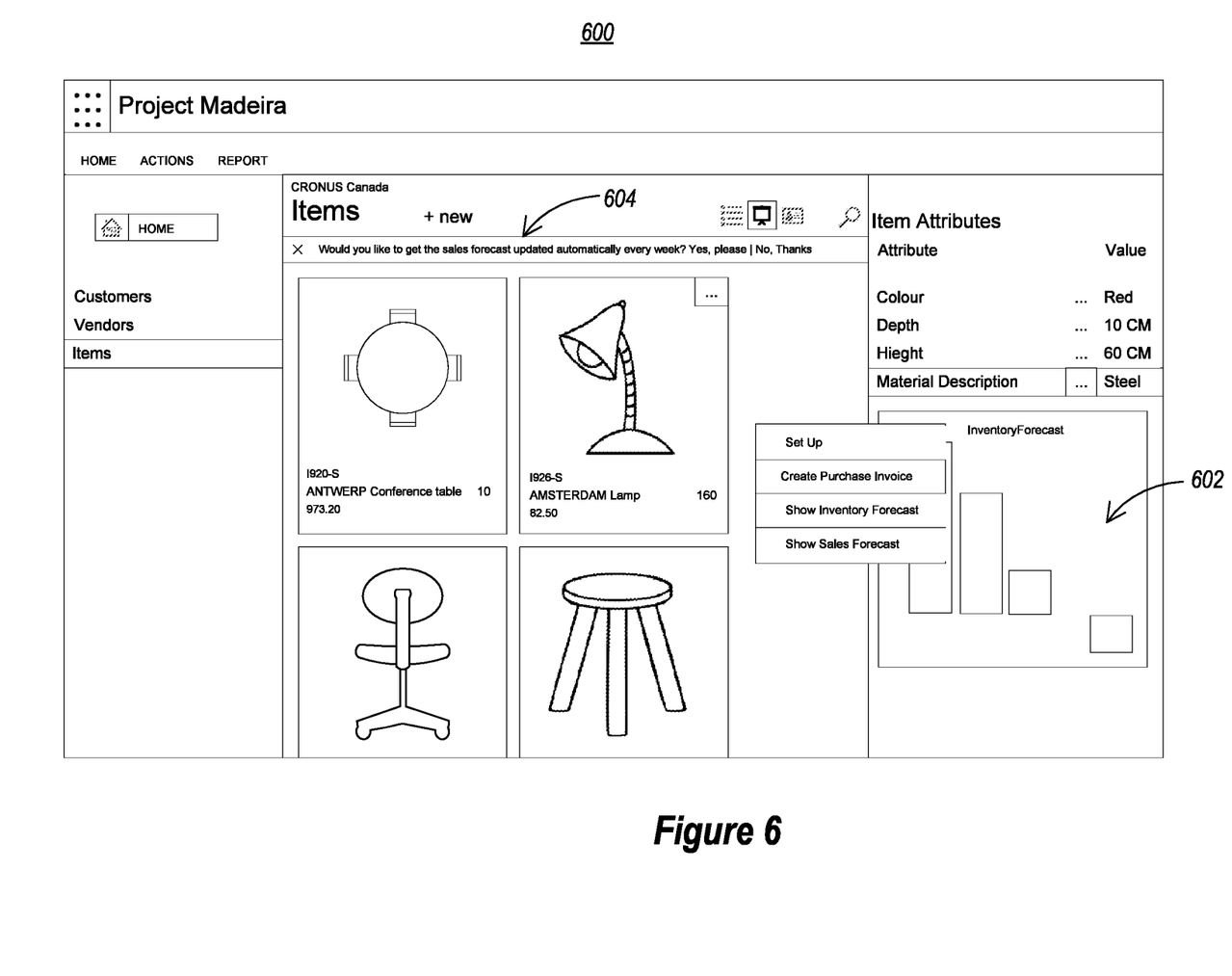
FIG. 6 illustrates another example user interface.

FIG. 6 illustrates an example where a user is in the context of viewing inventory information in a user interface 600. In the example illustrated in FIG. 6, a user is presented with an inventory forecast 602. The inventory forecast 602 may be provided by the machine learning service 202 to the ML notification subsystem 214, which provides the forecast 602 to the notification subsystem 222. The notification subsystem 222 can display the inventory forecast 602 in the user interface 600. Here, various prompts can be provided to the user or the user has various user interface options that the user can initiate sua sponte. For example, a user can be prompted with a prompt 604 asking whether the user would like automated updated forecast data according to some schedule. If the user responds in the affirmative, a workflow item can be added to the ML workflow subsystem 216 to provide automated forecast data according to the schedule. Alternatively or additionally, the user could manually specify parameters that would cause a workflow item to the ML workflow subsystem 216.

Thus, a user could manually initiate other work in an inline process, inline with receiving forecast data. In particular, embodiments can allow a user to manually initiate tasks from the same user interface that provides the machine learning prediction. Thus, for example, a user can view the forecast 602. The user may be able to right click on the forecast 602 and be presented with a number of options. Such options may include options that allow the user to see different predictions that resulted in the displayed prediction (in this example, the forecast 602). Thus, in the illustrated example, a user can initiate displaying an inventory forecast and/or a sales forecast. Alternatively, the user may be able to initiate actions based on the forecast 602. For example, as illustrated, a user may be able to create an invoice to purchase inventory.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 7:
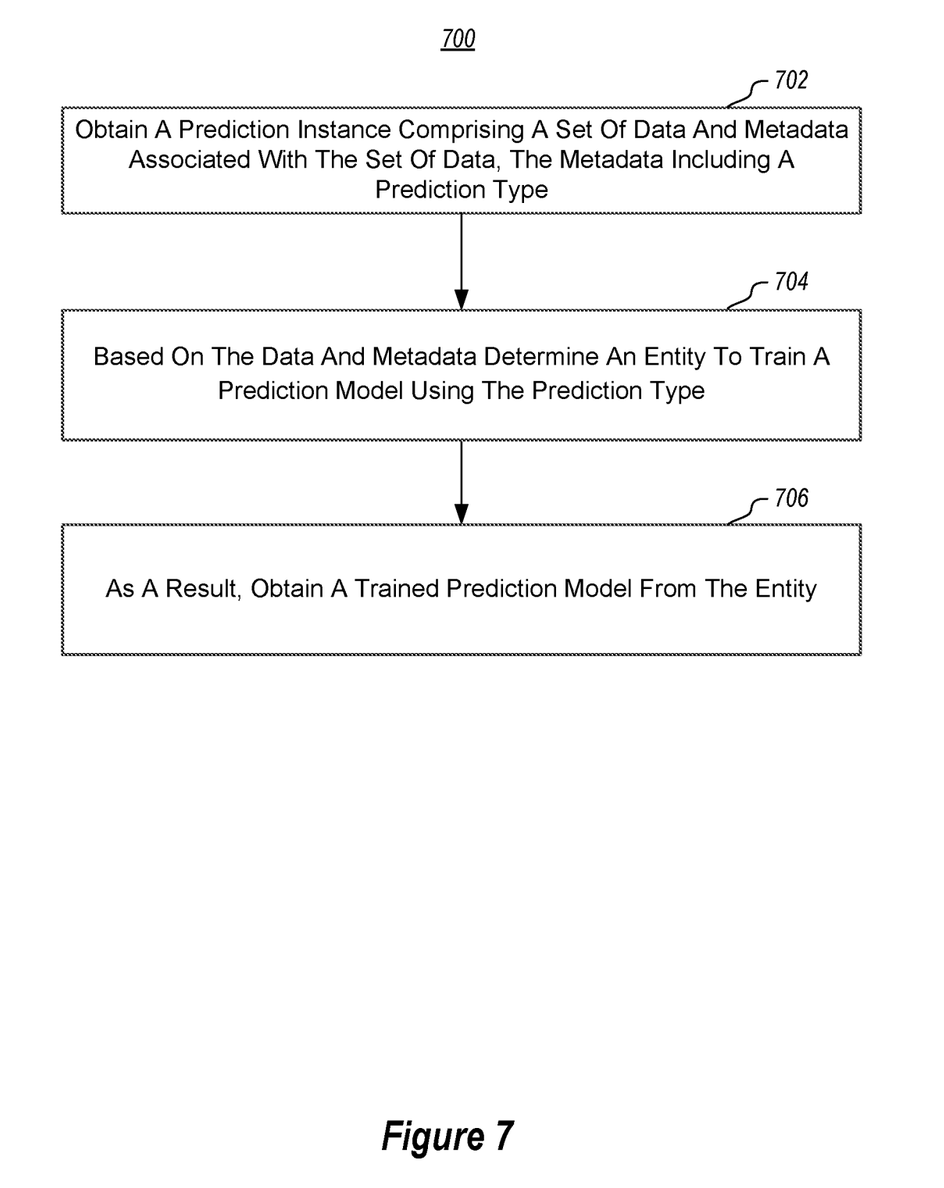
FIG. 7 illustrates a method of applying machine learning types to data.

Referring now to FIG. 7, a method 700 is illustrated. The method 700 may be practiced in a computing environment. The method includes acts for applying machine learning prediction types to data.

The method includes obtaining a prediction instance comprising a set of data and metadata associated with the set of data, the metadata including a prediction type (act 702). For example, in the illustrated example, the data may include invoice numbers, average days late on invoices, total amount of a particular invoice, payment terms, and potentially late days for a particular invoice. In other examples, other enterprise data, or other data generally may be obtained. The data may include or be associated with table joins or other operations to obtain the data. The metadata may include an identification of a machine learning type (e.g., regression) identification of identifiers, identification of features and/or identification of labels in the data 202.

The method 700 further includes based on the data and metadata determining an entity to train a prediction model using the prediction type (act 704). For example, the system 200 may analyze the data 204 and metadata 206 and determine whether to send the data to the machine learning service 202 to train the model or to have a model trained locally. Sometimes the data 204 and metadata 206 will not be sent to the machine learning service 202 because analysis can be conducted locally and/or the machine learning service 202 would not provide meaningful analysis.

The method 700 further includes, as a result, obtaining a trained prediction model from the entity (act 706). Thus, for example, a prediction model can be obtained from the machine learning service 202 or from the machine learning prediction subsystem 210.

Figure 8:
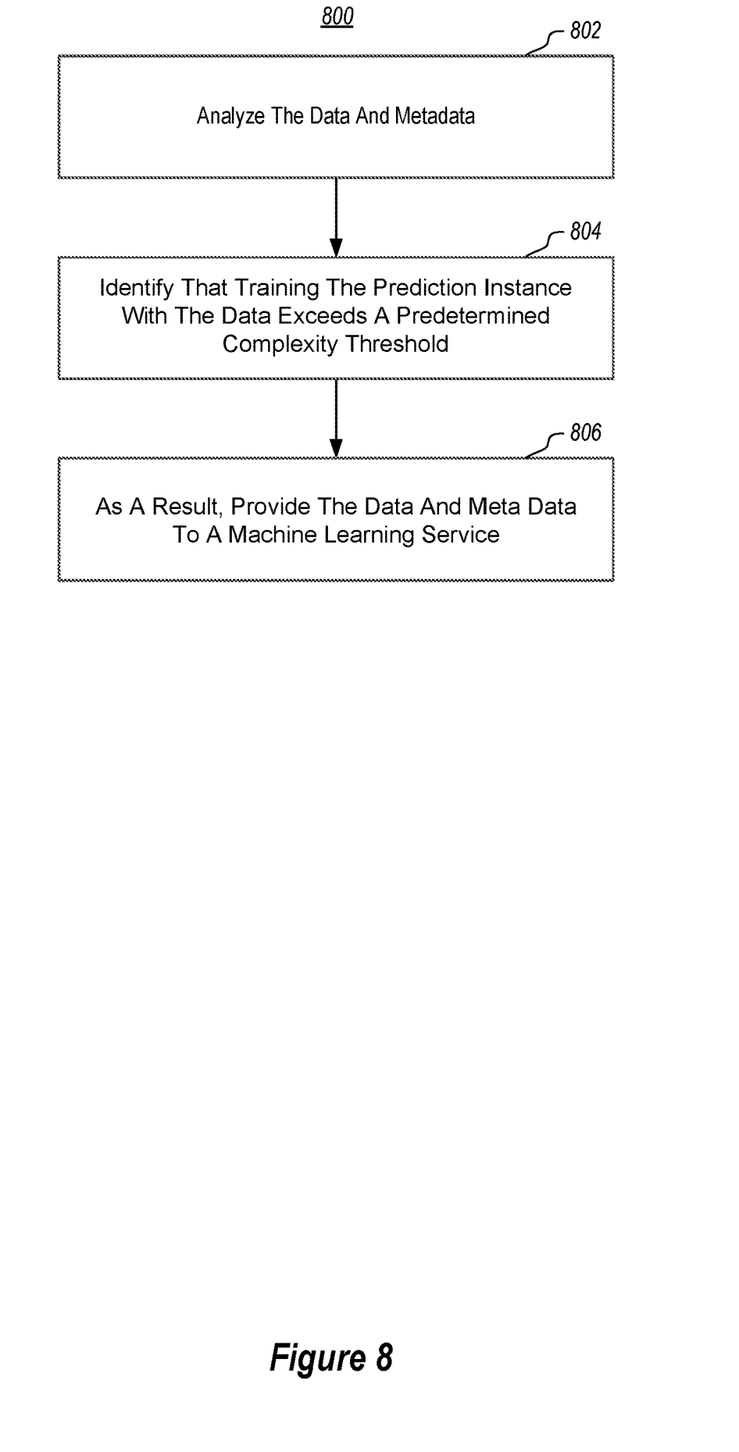
FIG. 8 illustrates a method for determining to provide the data and metadata to the remote machine learning service.

The method 700 may be practiced where the entity is the remote machine learning service. As illustrated in FIGS. 3 (at 302) and 4 (at 402) training and prediction are performed by the remote machine learning service 202. Further, reference is now made to FIG. 8, which illustrates a method for determining to provide the data and metadata to the remote machine learning service. FIG. 8 illustrates analyzing the data and metadata (act 802). FIG. 8 further illustrates identifying that training the prediction instance with the data exceeds a predetermined complexity threshold, for example in terms of size of training data, (act 804). The method 800 further includes, as a result, providing the data and meta data to a machine learning service (act 806).

As noted above, the metadata identifies a machine learning prediction type. In this case, the data and the metadata are provided to the machine learning service which applies a generic example of the machine learning prediction type identified. Thus in the illustrated example, the metadata 206 identifies a regression prediction type which then causes the data 204 to be applied to a generic regression prediction type at the machine learning service 202.

Figure 9:
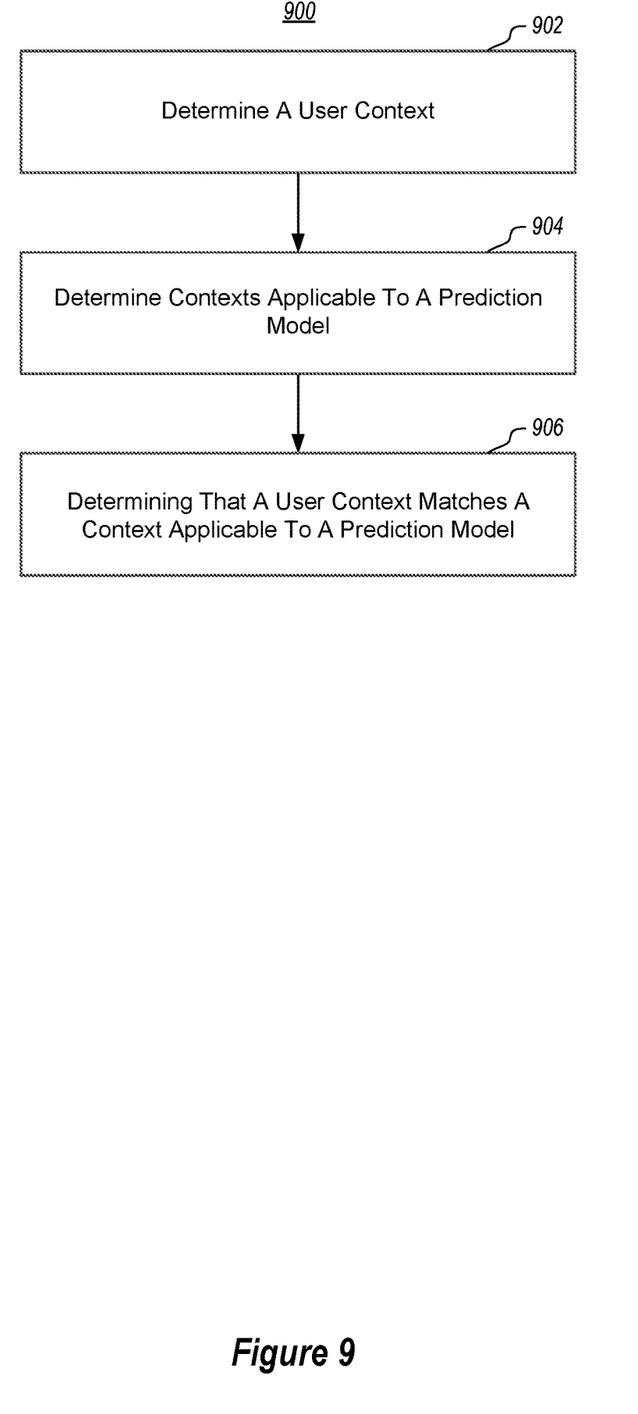
FIG. 9 illustrates a method for proactively applying a prediction model.

In some embodiments the method further includes monitoring user contextual information and proactively applying the prediction model to the prediction instance when contextually relevant and providing contextually relevant suggestions based on the results of applying the prediction model to the prediction instance. Such context may be point of execution in an application, user interface screen, user physical location, user role, role in and state of workflow, state of application data, etc. Predictions may be automatically made. Embodiments can match predictions to context. Based on the context and prediction match, suggestions may be provided to the user. For example, as illustrated above, if a user is in a purchase invoice user interface context and a prediction is made that additional inventory of an item is needed, the user can be prompted to add the item to the purchase invoice. For example, FIG. 9 illustrates a method 900 for proactively applying a prediction model including determining a user context (act 902). The method 900 further includes determining contexts applicable to a prediction model (act 904). The method 900 further includes determining that a user context matches a context applicable to a prediction model (act 906).

Figure 10:
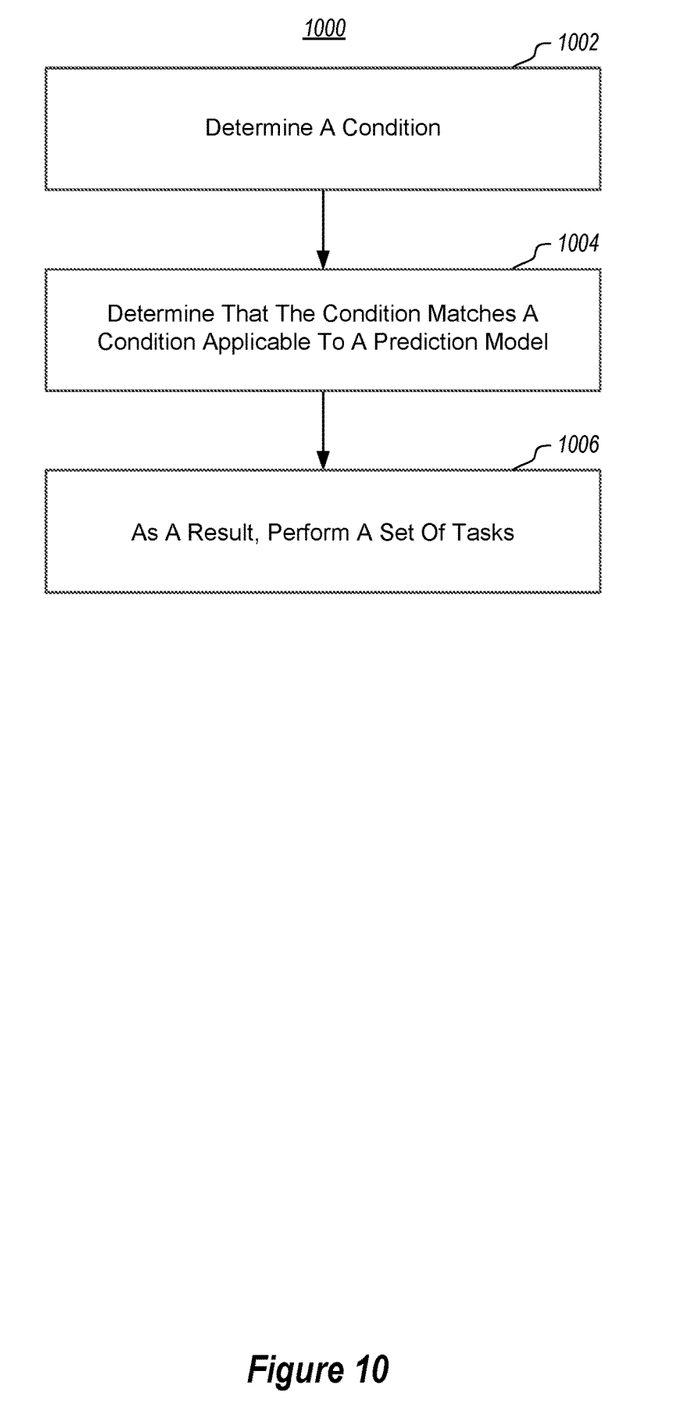
FIG. 10 illustrates a method for monitoring current conditions and automatically performing a function based on application of the prediction model to the prediction instance.

In some embodiments the method 700 further includes monitoring current conditions and automatically performing a function based on application of the prediction model to the prediction instance. For example, as illustrated above, invoices could be automatically generated when new inventory is needed. For example, FIG. 10 illustrates a method 1000 for monitoring current conditions and automatically performing a function based on application of the prediction model to the prediction instance. The method 1000 includes determining a condition (act 1002). The method 1000 further includes determining that the condition matches a condition applicable to a prediction model (act 1004). The method 1000 further includes, as a result, performing a set of tasks (act 1006).

Figure 11:
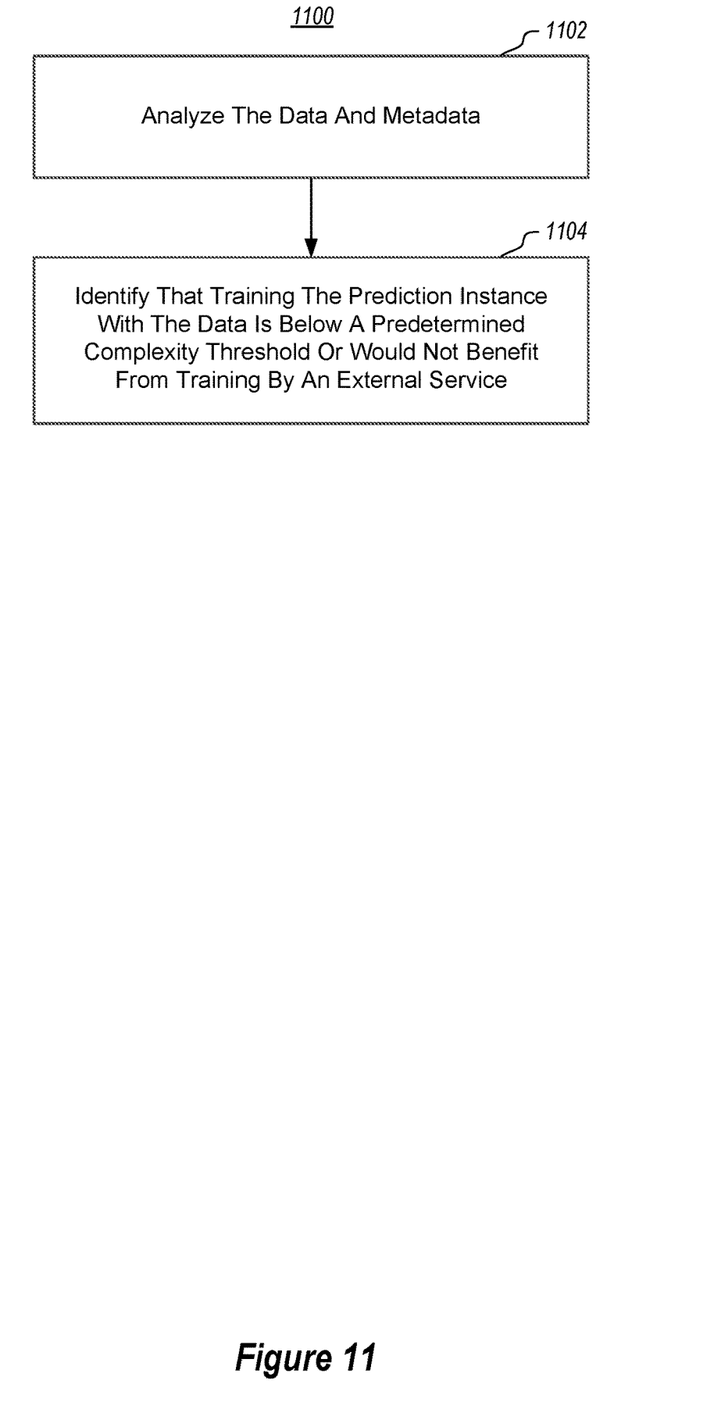
FIG. 11 illustrates a method for determining to not provide the data and metadata to a remote machine learning service.

The method 700 may be practiced where the entity a local system. For example, as illustrated above, the ML optimization subsystem 212 may determine that a time series is white noise and that analysis by the machine learning service 202 would not be useful. FIG. 11, illustrates a method for determining to provide the data and metadata to the local system. FIG. 11 illustrates analyzing the data and metadata (act 1102). FIG. 2 further illustrates identifying that training the prediction instance with the data is below a predetermined complexity threshold or would not benefit from training by an external service (act 1104).

The method 700 may be practiced where the metadata is included in a data table with the data, such as is illustrated in FIG. 1. Alternatively, the method 700 may be practiced where the metadata is included in a side structure separate from a table with the data.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
   one or more processors; and
   one or more computer-readable media having stored thereon instructions that are executable by the one or more processors to configure the computer system to apply machine learning prediction to data, including instructions that are executable to configure the computer system to perform at least the following:
   obtain a prediction instance comprising a set of training data in a table, wherein the table has been annotated with metadata stored in the table together with the set of training data, the metadata including a prediction type for the set of training data in the table;
   based on the set of training data and meta data determine an entity to train a prediction model using the prediction type;
   as a result, obtain a trained prediction model, trained using the prediction type in the meta data, from the entity; and
   monitor user contextual information and proactively apply the prediction model to the prediction instance when contextually relevant and provide contextually relevant suggestions based on results of applying the prediction model to the prediction instance.

2. The computing system of claim 1, wherein the entity is a remote machine learning service.

3. The computing system of claim 1, wherein the one or more computer-readable media further have stored thereon instructions that are executable by the one or more processors to configure the computer system to monitor current conditions and automatically perform a function based on application of the prediction model to the prediction instance.

4. The computing system of claim 1, wherein the prediction instance is updated to include a record for prediction, wherein the one or more computer-readable media further have stored thereon instructions that are executable by the one or more processors to configure the computer system to determine that a prediction should be performed locally for the record for prediction using the trained prediction model and the prediction instance.

5. The computing system of claim 1, wherein the entity is a local system.

6. The computing system of claim 5, wherein determining the entity to train the prediction model is performed as a result of determining that a time series in the data is white noise.

7. The computing system of claim 1, wherein the metadata is also included in a side structure separate from the table with the data.

8. A computer implemented method of applying machine learning prediction to data, the method comprising:
- obtaining a prediction instance comprising a set of data in a table and metadata in the table with the set of data, the metadata in the table comprising metadata that is applicable to the entire table and individual column metadata in columns of the table applicable to respective individual columns in the table, the metadata including a prediction type;
- based on the data and meta data determining an entity to train a prediction model using the prediction type for the set of data in the table;
- as a result, obtaining a trained prediction model, trained using the prediction type in the metadata, from the entity; and
- monitoring user contextual information and proactively applying the prediction model to the prediction instance when contextually relevant and providing contextually relevant suggestions based on results of applying the prediction model to the prediction instance.

9. The method of claim 8, wherein the entity is a remote machine learning service.

10. The method of claim 8, further comprising monitoring current conditions and automatically performing a function based on application of the prediction model to the prediction instance.

11. The method of claim 8, wherein the prediction instance is updated to include a record for prediction, the method further comprising determining that a prediction should be performed locally for the record for prediction using the trained prediction model and the prediction instance.

12. The method of claim 8, wherein the entity is a local system.

13. The method of claim 12, wherein determining the entity to train the prediction mode is performed as a result of determining that a time series in the data is white noise.

14. The method of claim 8 wherein the metadata is also included in a side structure separate from the table with the data.

15. A computer system comprising:
- a machine learning subsystem comprising:
- a machine learning optimization system configured to obtain a prediction instance comprising a set of training data in a table and meta data in the table associated with the set of training data, the metadata identifying a prediction type for the set of training data in the table, and based on the training data and meta data determine a n entity to train a prediction model, trained using the prediction type in the metadata, using the prediction type; and
- a machine learning notification system configured to monitor user contextual information and proactively apply the prediction model to the prediction instance when contextually relevant and provide contextually relevant suggestions based on results of applying the prediction model to the prediction instance.

16. The computing system of claim 15, further comprising a machine learning workflow system to monitor current conditions and automatically perform a function based on application of the prediction model to the prediction instance.

17. The computing system of claim 15, further comprising a ma chine learning prediction subsystem configured to train the prediction model at the machine learning subsystem according to the prediction type and update the prediction instance with the trained prediction model.

18. The computing system of claim 15, wherein the entity is a remote machine learning service.

19. The computing system of claim 15, wherein the entity is a local system.

20. The computing system of claim 15, wherein determining the entity to train the prediction model is configured to be performed as a result of determining that a time series in the data is white noise.

* * * * *